(12) United States Patent
Itakura (10) Patent No.: US 7,419,213 B2
(45) Date of Patent: *Sep. 2, 2008

(54) SEAT COVER

(76) Inventor: Tsuyoshi Itakura, 8-5-12 Ueda, Matsubara-city, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/555,714

(22) Filed: Nov. 2, 2006

(65) Prior Publication Data

US 2007/0145797 A1 Jun. 28, 2007

Related U.S. Application Data

(62) Division of application No. 11/338,772, filed on Jan. 25, 2006, now Pat. No. 7,172,246.

(30) Foreign Application Priority Data

Dec. 26, 2005 (JP) ............... 2005-10932

(51) Int. Cl.
 A47C 31/00 (2006.01)
 A47C 7/02 (2006.01)
(52) U.S. Cl. .............. 297/219.1; 297/452.47
(58) Field of Classification Search .............. 297/219.1, 297/218.1, 229, 452.47, 220, 228.1, 225
See application file for complete search history.

(56) References Cited

U.S. PATENT DOCUMENTS

| 2,877,832 | A | 3/1959 | Reavis |
| 3,331,089 | A | 7/1967 | Ornas, Jr. et al. |
| 4,676,549 | A | 6/1987 | English |
| 4,844,539 | A | 7/1989 | Selbert |
| 5,501,165 | A | 3/1996 | Nagashima |
| 6,309,017 | B1 | 10/2001 | Middleton |
| 6,817,664 | B1 | 11/2004 | Tang et al. |
| 7,011,367 | B2 | 3/2006 | Riley |

FOREIGN PATENT DOCUMENTS

JP 2-152412 6/1990

OTHER PUBLICATIONS

English language abstract of JP 2-152412.

Primary Examiner—Milton Nelson, Jr.
(74) Attorney, Agent, or Firm—Greenblum & Bernstein, P.L.C.

(57) ABSTRACT

A bordering edge of cover members and a bordering edge of cover members of a sitting portion cover of a seat cover are folded back in a longitudinal direction along raised portions of a sitting portion, creased, and attached to the rest of the members while being smoothly curved in conformance to the raised portions, thus to form a three-dimensional curved shape conforming to a top surface of the sitting portion. A bordering edge of cover members and a bordering edge of cover members of a backrest cover are folded back in a longitudinal direction along raised portions of a backrest portion, creased, and attached to the rest of the members while being smoothly curved in conformance to the raised portions, thus to form a three-dimensional curved shape conforming to a front surface of the backrest.

15 Claims, 9 Drawing Sheets

SEAT COVER

CROSS-REFERENCE TO RELATED APPLICATIONS

This application is a divisional of United States patent application Ser. No. 11/338,772 filed on Jan. 25, 2006, now U.S. Pat. No. 7,172,246 which issued Feb. 6, 2007, which claims priority to Japanese Application No. 2005-10932, filed Dec. 26, 2005, the contents of which are expressly incorporated by reference in their entireties.

BACKGROUND OF THE INVENTION

1. Field of the Invention

The present invention relates to a seat cover for seats installed in vehicles including automobiles, aircrafts, trains, ships and the like and buildings including movie theaters, play theaters, halls, public facilities and the like. More particularly, the present invention relates to a seat cover for covering a surface cover which covers a seat.

2. Description of the Prior Art

An exemplary conventional cover as described above is a vehicle seat assembly (Japanese Publication for Opposition No. 6-95968). The vehicle seat assembly disclosed in this publication includes a seat cover including a first cover member having an edge tucked to fit rounded corners and a second cover member adjacent to and engaged with the first cover member, a foam pad fixed to a frame and accommodated between the first cover member and the second cover member, and a seam passing through both the first cover member and the second cover member and running parallel to the edges thereof.

With the above-described cover, the edges of the cover members are tucked to form uniform gathers along the rounded corners. Since the edges are uniformly tucked, the number of the gathers cannot be partially changed. In addition, a sitting surface of a seat may occasionally be curved so as to stably hold the posture of the person sitting thereon. With the above-described technique, it is difficult to produce a cover having a three-dimensional curved shape fitting such an external shape of the sitting surface of the seat.

SUMMARY OF THE INVENTION

A main object of the present invention is to provide a seat cover closely fitting an external surface of a seat and providing the user with a sense of snugness as if the surface cover of the seat itself was changed, a sense of stability that his/her body is appropriately held, and a couch-like comfort.

These and other advantages of the present invention will become readily apparent to those skilled in the art upon reading the following detailed description of the embodiments with reference to the attached drawings.

DESCRIPTION OF THE PREFERRED EMBODIMENTS

The present invention will be described below by way of embodiments with reference to the attached drawings.

Figure 1:
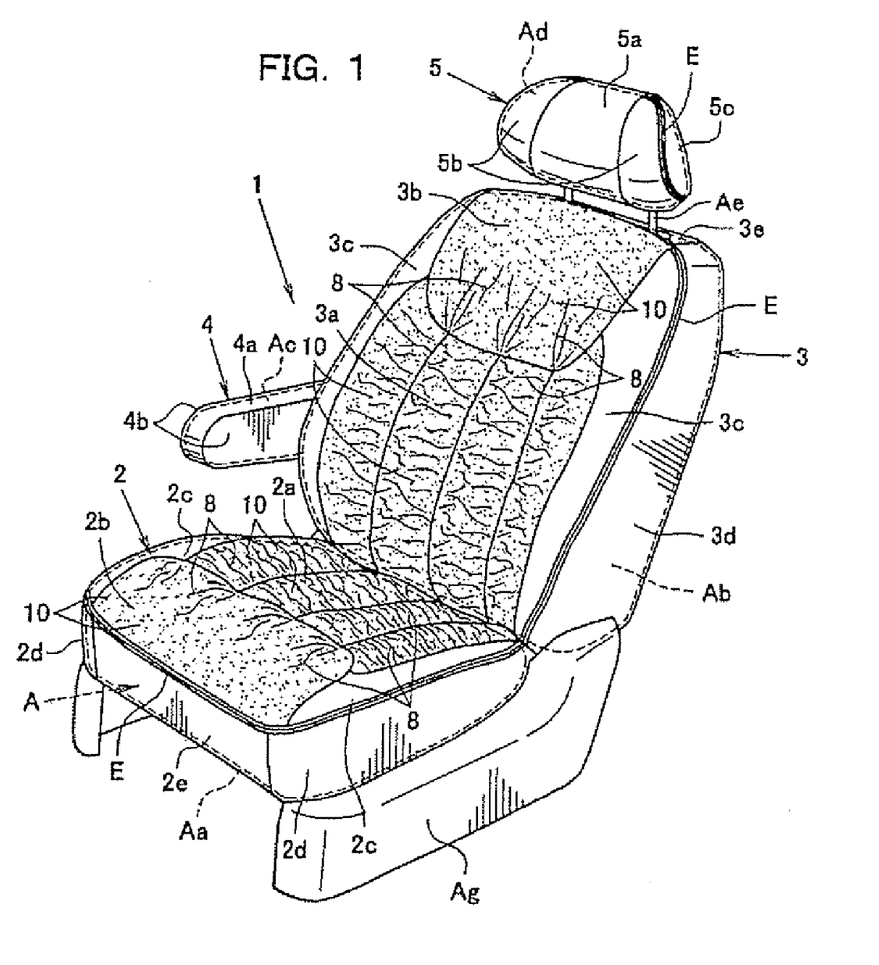
FIG. 1 is an isometric view of a seat cover according to a first embodiment of the present invention in the state where the seat cover covers a seat.

FIG. 1 through FIG. 6 show a seat cover 1 according to a first embodiment of the present invention. The seat cover 1 is usable for covering a seat A of an automobile as an example of vehicles. As shown in FIG. 1, the seat cover 1 includes a sitting portion cover 2 for covering a sitting portion Aa of the seat A, a bag-like backrest cover 3 for covering a backrest Ab connected to a rear end of the sitting portion Aa, an armrest cover 4 for covering an armrest Ac connected to a side of the backrest Ab, and a headrest cover 5 for covering a headrest Ad attached to a top end of the backrest Ab.

Figure 3:
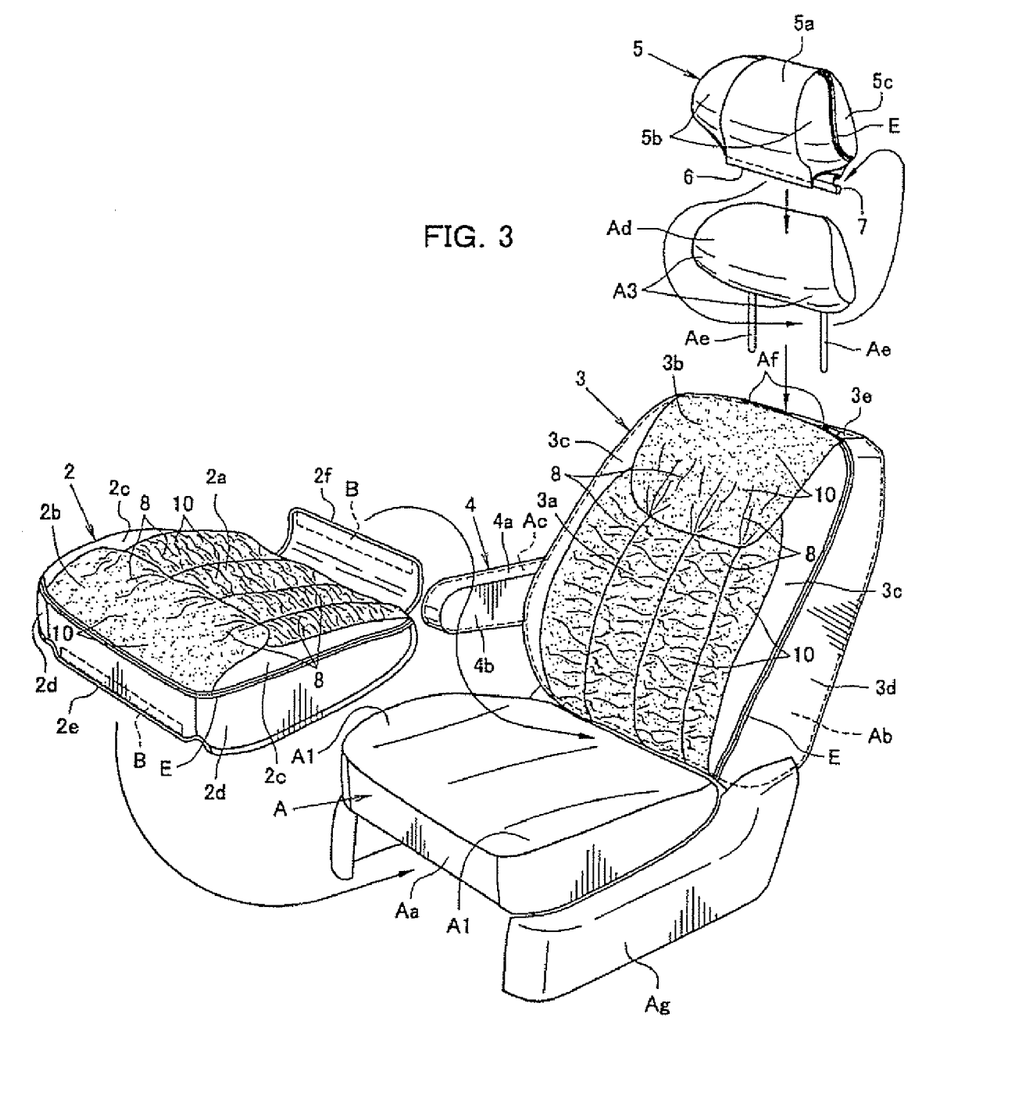
FIG. 3 is an isometric view of the seat cover according to the first embodiment of the present invention, illustrating a method for putting a sitting portion cover and a headrest cover on the seat.

As shown in FIG. 1 and FIG. 3, the sitting portion cover 2 includes a first cover member 2a for covering a main part of a top surface of the sitting portion Aa, a second cover member 2b for covering a front part of the top surface of the sitting portion Aa, a pair of third cover members 2c for covering right and left side parts of the top surface of the sitting portion Aa, a pair of fourth cover members 2d for covering right and left side surfaces of the sitting portion Aa, a fifth cover member 2e for covering a front surface of the sitting portion Aa, and a sixth cover member 2f for covering a rear surface of the sitting portion Aa. The first cover member 2a, the second cover member 2b, and the pair of third cover members 2c form a top portion of the sitting portion cover 2. The first cover member 2a, the second cover member 2b, and the pair of third cover members 2c are sewn together along bordering edges thereof. The pair of fourth cover members 2d, the fifth cover member 2e, and the sixth cover members 2f are sewn together along the bordering edges thereof. The first through sixth cover members 2a through 2f have sizes and shapes corresponding to the respective surfaces of the sitting portion Aa.

Figure 5:
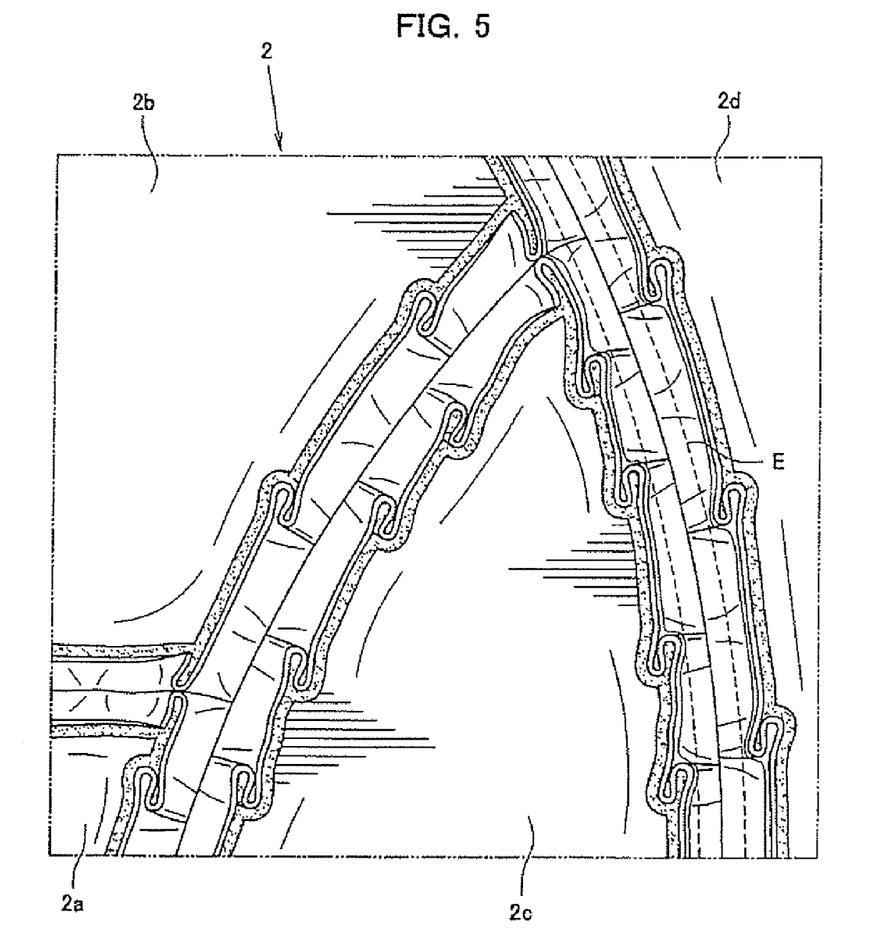
FIG. 5 is an enlarged view illustrating stitches on the sitting portion cover.

The first cover member 2a/the second cover member 2b/the pair of third cover members 2c assembly and the pair of fourth cover members 2d/the fifth cover member 2e/the sixth cover member 2f assembly are sewn together. As shown in FIG. 5 in detail, the bordering edge of the second cover member 2b/the pair of third cover members 2c and the bordering edge of the pair of fourth cover members 2d/the fifth cover member 2e are folded back in a longitudinal direction along raised portions A1 (FIG. 3) which are formed on right and left sides of the sitting portion Aa. The bordering edges are creased such that the bordering edge having a smaller radius of curvature has a larger number of creases or a larger creased area than the bordering edge having a larger radius of curvature. In this manner, the bordering edges are curved smoothly so as to fit the raised portions A1. In addition, the creased bordering edges are attached to the remaining part of the respective members with stitches E while being kept smoothly curved in conformance to the raised portions A1. Two stitch lines are formed parallel to each other along the line along which the members are sewn together. In this manner, a three-dimensional curved shape conforming to the top surface of the sitting portion Aa is provided.

The fifth cover member 2e and the sixth cover member 2f each have a hook part of a mechanical fastener B, on a rear surface of a bottom edge thereof, for fixing the sitting portion cover 2 to a napped surface of a cloth cover which is put on the sitting portion Aa. A loop part of a mechanical fastener B may be provided on an area of the napped surface corresponding to the hook part.

A bottom edge of each fourth cover member 2d is deformable so as to be pushed into the gap between a bottom side edge of the sitting portion Aa and a top side edge of a side-covering hem member Ag, and is recoverable so as not to be pulled out through the gap after being pushed into the gap.

Figure 2:
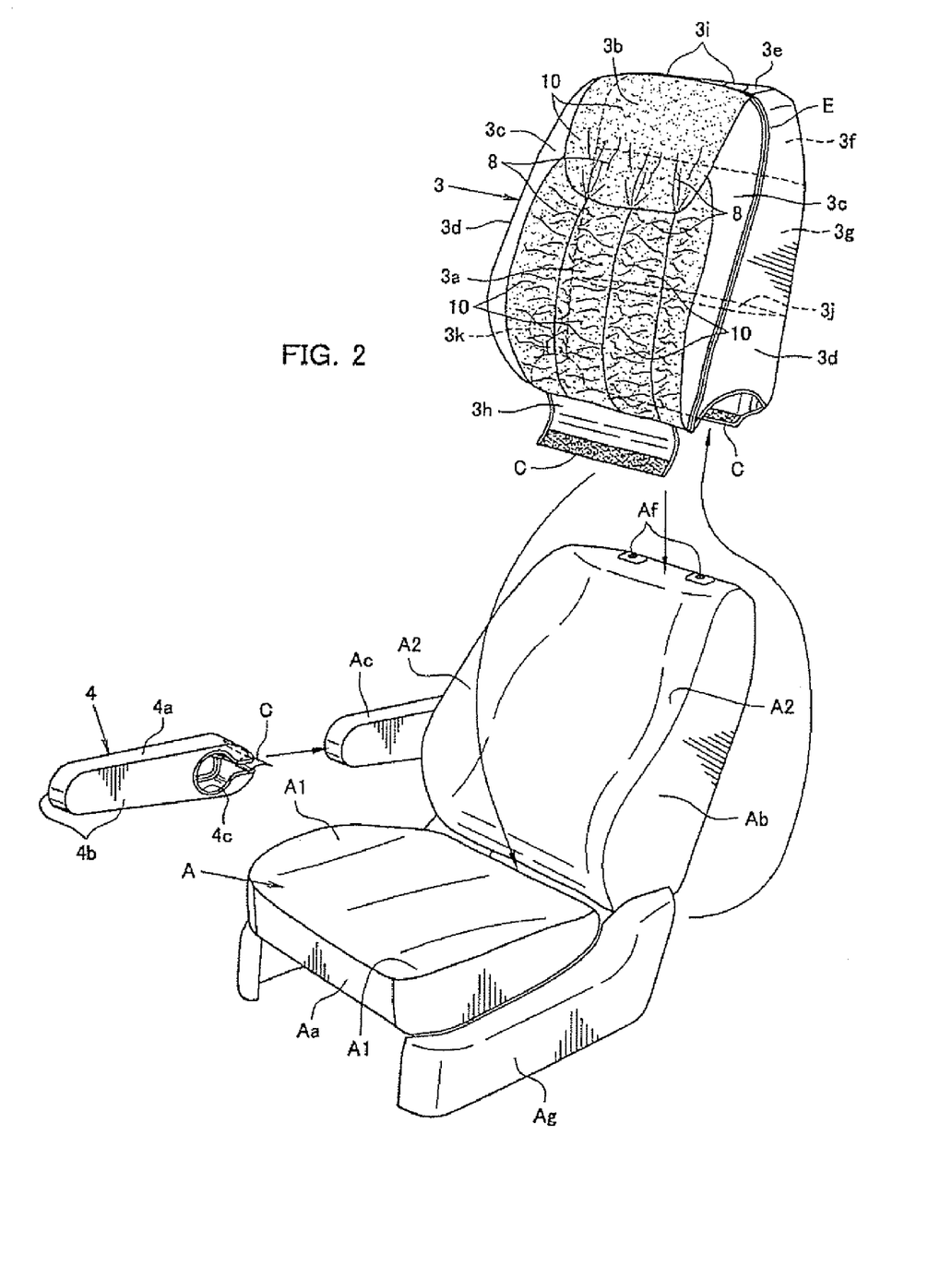
FIG. 2 is an isometric view of the seat cover according to the first embodiment of the present invention, illustrating a method for putting a backrest cover and an armrest cover on the seat.

As shown in FIG. 1 and FIG. 2, the backrest cover 3 includes a first cover member 3a for covering a main part of a front surface of the backrest Ab, a second cover member 3b for covering an upper part of the front surface of the backrest Ab, a pair of third cover members 3c for covering right and left side parts of the front surface the backrest Ab, a pair of fourth cover members 3d for covering right and left side surfaces of the backrest Ab, a fifth cover member 3e for covering a top surface of the backrest Ab, a sixth cover member 3f for covering an upper part of a rear surface of the backrest Ab, and a seventh cover member 3g for covering a lower part of the rear surface of the backrest Ab. The first cover member 3a, the second cover member 3b, and the pair of third cover members 3c form a front portion of the backrest cover 3. The first cover member 3a, the second cover member 3b, and the pair of third cover members 3c are sewn together along bordering edges thereof. The pair of fourth cover members 3d, the fifth cover member 3e, the sixth cover member 3f, and the seventh cover member 3g are sewn together along bordering edges thereof. The first through eighth cover members 3a through 3h have sizes and shapes corresponding to the respective surfaces of the backrest Ab (the eighth member 3h will be described later).

The first cover member 3a/the second cover member 3b/the pair of third cover members 3c assembly and the pair of fourth cover members 3d/the fifth cover member 3e/the sixth cover member 3f/the seventh cover member 3g assembly are sewn together. Like in the case of the sitting portion cover 2, the bordering edge of the second cover member 3b/the pair of third cover member 3c and the bordering edge of the pair of fourth cover member 3d/the fifth cover member 3e are folded back in a longitudinal direction along raised portions A2 (FIG. 2) which are formed on right and left sides of the backrest Ab. The bordering edges are creased such that the bordering edge having a smaller radius of curvature has a larger number of creases or a larger creased area than the bordering edge having a larger radius of curvature. In this manner, the bordering edges are curved smoothly so as to fit the raised portions A2. In addition, the creased bordering edges are attached to the remaining part of the respective members with stitches E while being kept smoothly curved in conformance to the raised portions A2. Two stitch lines are formed parallel to each other along the line along which the members are sewn together. In this manner, a three-dimensional curved surface conforming to the front surface of the backrest Ab is provided. Non-creased parts of the bordering edges may also be stitched.

The eighth cover member 3h sewed to a bottom edge of the first cover member 3a is deformable so as to be pushed into the gap between a rear edge of the sitting portion Aa and a bottom edge of the backrest Ab. The seventh cover member 3g and the eighth cover member 3h have a mechanical fastener C provided along edges thereof bordering on each other. The mechanical fastener C includes a hook part and a loop part, which are detachably fixable to each other. With the mechanical fastener C, the seventh cover member 3g and the eighth cover member 3h are detachably fixed to each other.

The fifth cover member 3e has holes 3i at a central portion thereof, through which insertion members Af provided on the top surface of the backrest Ab are allowed to pass. The seventh cover member 3g has a pocket 3j on an external surface thereof for accommodating various small things for daily use.

One of the fourth cover members 3d has a bypass portion 3k at a bottom edge thereof, such that a connection portion for connecting the backrest Ab and the armrest Ac is exposed through the bypass portion. The bypass portion 3k has a mechanical fastener C (not shown), provided at a bottom edge thereof below the connection portion, for detachably fixing the bottom edge.

The armrest cover 4 includes a belt-shaped first cover member 4a for covering a top surface and a bottom surface of the armrest Ac, and a pair of second cover members 4b for covering right and left side surfaces of the armrest Ac. The first cover member 4a and the second cover members 4b are sewn together along bordering edges thereof. The first cover member 4a has a mechanical fastener C provided at a rear edge thereof, for detachably fixing the rear edge. Each second cover member 4b has an opening 4c at a position corresponding to the connection portion for connecting the backrest Ab and the armrest Ac. The connection portion is allowed to pass through the openings 4c.

The first and second covers 4a and 4b have sizes and shapes corresponding to the respective surfaces of the armrest Ac.

As shown in FIG. 1 and FIG. 3, the headrest cover 5 includes a first cover member 5a for covering a central part of a front surface and a central part of a rear surface of the headrest Ad, a pair of second cover members 5b for covering right and left side parts of the front surface of the headrest Ad, and a pair of third cover members 5c for covering right and left side parts of the rear surface of the headrest Ad. The first through third cover members 5a through 5c are sewn together along bordering edges thereof. The first through third cover members 5a through 5c have sizes and shapes corresponding to the respective surfaces of the headrest Ad.

The bordering edge of the pair of second cover members 5b and the bordering edge of the pair of third cover members 5c are folded back in a longitudinal direction along raised portions A3 (FIG. 3) which are formed on right and left side parts of the headrest Ad. The bordering edges are creased so as to be curved smoothly and thus fit the raised portions A3. In addition, the creased bordering edges are attached to the remaining part of the respective members with stitches E while being kept smoothly curved in conformance to the raised portions A3. Two stitch lines are formed parallel to each other along the line along which the members are sewn together. In this manner, a three-dimensional curved shape conforming to the front surface of the headrest Ad is provided.

The first cover member 5a has a plate-like insertion member 6 attached to a front bottom edge thereof and a receiving member 7 attached to a rear bottom edge thereof. The insertion member 6 and the receiving member 7 are provided to face each other. The receiving member 7 has a U-like side shape, and the insertion member 6 is engageable with the receiving member 7. The insertion member 6 is engaged with the receiving member 7 provided rearward thereto, and thus the front and rear bottom edges of the first cover member 5a are secured between two shafts Ae while being attached together. The shafts Ae project downward from a bottom end of the headrest Ad.

The first cover member 2a included in the top portion of the sitting portion cover 2 is creased, such that a plurality of (or a great number of) creases 8 each extending in a width direction of the top portion are formed and arranged in a plurality of columns running in a depth direction thereof at a predetermined interval. The first cover member 3a included in the front portion of the backrest cover 3 is creased, such that a plurality of (or a great number of) creases 8 each extending in a width direction of the front portion are formed and arranged in a plurality of columns running in a height direction thereof at a predetermined interval. On the second cover member 2b, a plurality of creases 8 each extending in the depth direction of the top portion are arranged in the width direction thereof at a predetermined interval. On the second cover member 3b, a plurality of creases 8 each extending in the height direction of the front portion are arranged in the width direction thereof at a predetermined interval.

Owing to such an arrangement, the creases 8 formed on the sitting portion cover 2 and the backrest cover 3 are deformed, i.e., expanded or shrunk, in accordance with the body shape and the posture of a person sitting on the seat A. Therefore, the sitting position and the sitting posture can be changed easily. The seat A provides a sense of stability and a couch-like comfort.

The first cover member 2a and the second cover member 2b of the sitting portion cover 2, and the first cover member 3a and the second cover member 3b of the backrest cover 3, have a plurality of (a great number of) air-permeation hole 10 at a predetermined interval.

Owing to the air-permeation holes 10, the top portion of the sitting portion cover 2 and the front portion the backrest cover 3 provide good air permeation, and thus prevent a part of the body contacting the sitting portion cover 2 and the backrest cover 3 from getting sweaty.

Figure 6:
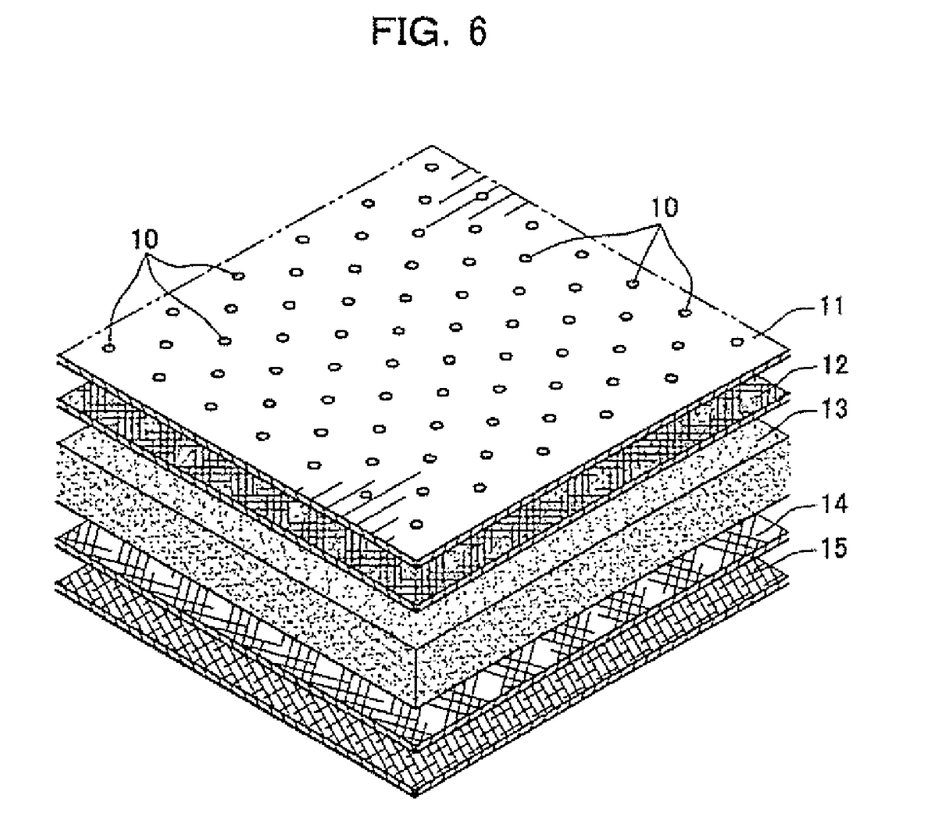
FIG. 6 is an enlarged isometric view illustrating a layer structure of the sitting portion cover and the backrest cover.

As shown in FIG. 6, the first cover member 2a and the second cover member 2b of the sitting portion cover 2, and the first cover member 3a and the second cover member 3b of the backrest cover 3, each include a leather layer 11, a high density cotton layer 12, a low repellence sponge layer 13, a tricot layer 14, and an air-permeable back layer 15, which are stacked in this order from the surface contacting the body of the user.

Owing to such a structure, the low repellence sponge layer 13 is appropriately deformed in accordance with the body shape, posture, body weight and the like of a person sitting on the seat A. In addition, the top portion of the sitting portion cover 2 and the front portion of the backrest cover 3 are curved so as to fit the body shape of the user. Therefore, the body of the user is kept at a stable posture, and the user can feel that his/her body is held securely.

The cover members 2c through 2f of the sitting portion cover 2 and the cover members 3c through 3h of the backrest cover 3, each include the leather layer 11, the tricot layer 14, and the air-permeable back layer 15, which are stacked in this order from the surface contacting the body of the user.

The leather layer 11 is formed of, for example, artificial leather such as PVC leather, which has a touch and an appearance close to those of genuine leather. The low repellence sponge layer 13 may have a thickness of about 10 mm or 15 mm in one example, but alternatively may have a thickness in the range of 10 mm to 15 mm, less than 10 mm, or more than 15 mm. Instead of PVC leather, the leather layer 11 may be formed of another type of artificial leather selected from various types in accordance with the use or purpose. Alternatively, genuine leather or the like is usable. The leather layer 11, the cotton layer 12, the tricot leather 14 and the back layer 15 may have any suitable thickness. The holes 10 and the low repellence sponge layer 13 may be provided in the entirety of the top portion of the sitting portion cover 2 and the entirety of the front portion of the backrest cover 3. Instead of the leather layer, fibrous or resin layer may be used as the top layer.

Hereinafter, a method for covering the seat A with the seat cover 1 will be described.

Before the sitting portion Aa is covered with the sitting portion cover 2, the backrest Ab is covered with the backrest cover 3 as follows. The headrest Ad is moved upward and pulled off from the top end of the backrest Ab. Then, as shown in FIG. 2, a bottom end of the backrest cover 3 is opened, and the backrest cover 3 is put on an external surface of the backrest Ab from above.

Next, the eighth cover member 3h of the backrest cover 3 is inserted from the front into the gap between the rear edge of the sitting portion Aa and the bottom edge of the backrest Ab. The eighth cover member 3h is pulled to the back of the backrest Ab, and the eighth cover member 3h and the seventh cover member 3g are detachably fixed to each other with the mechanical fastener C. Also, the insertion members Af provided on the top surface of the backrest Ab are inserted into the holes 3i provided on the top part of the backrest cover 3, such that an inner peripheral edge of each hole 3i is below the corresponding insertion member Af.

Figure 4:
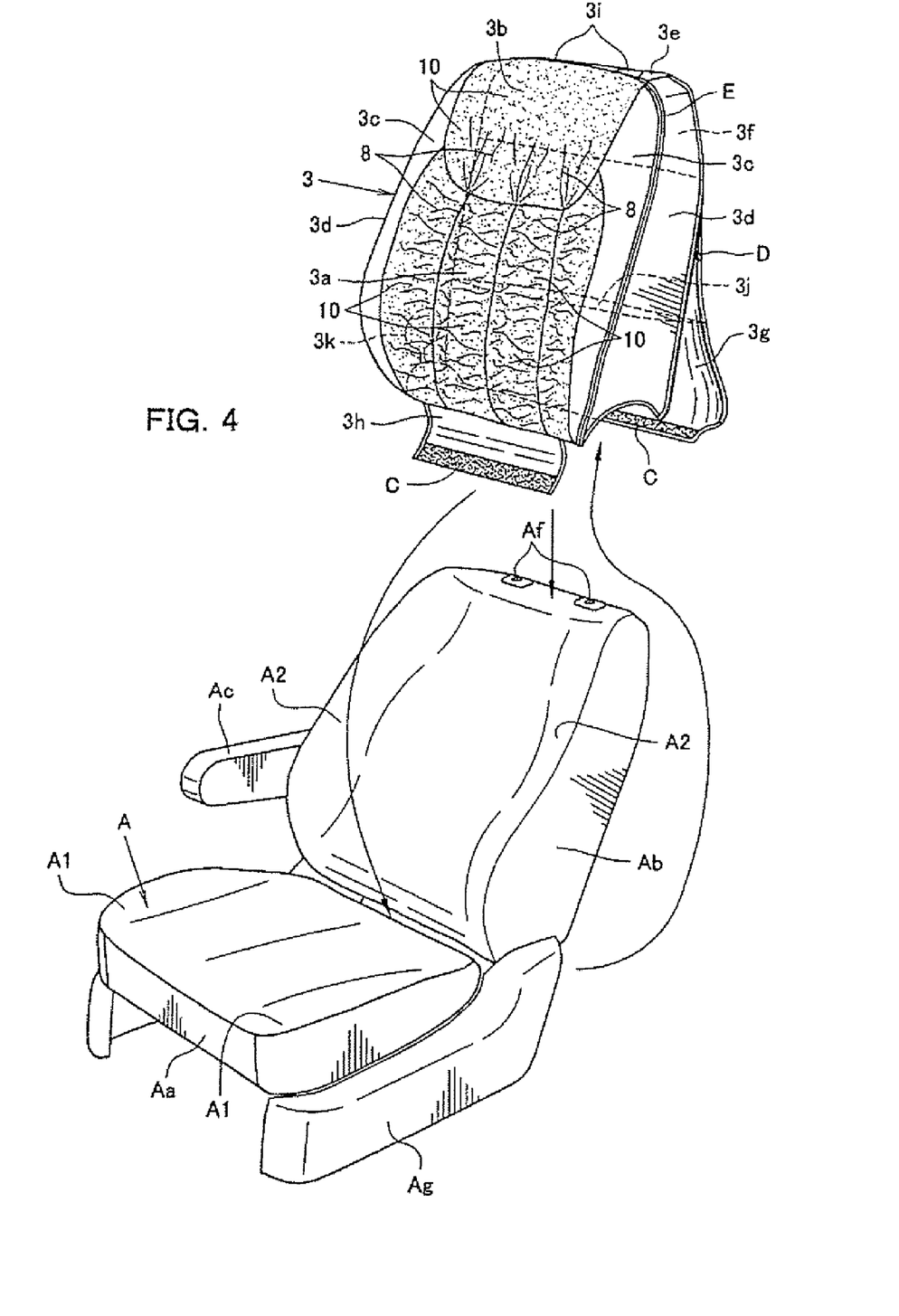
FIG. 4 is an isometric view of the seat cover according to the first embodiment of the present invention, in the state where a slide fastener is attached to the backrest cover.

As shown in FIG. 4, a slide fastener D may be attached along the bordering edges of the fourth cover members 3d and the seventh cover member 3g of the backrest cover 3. With the slide fastener D, the bottom end of the backrest cover 3 can be opened widely, and thus the work of putting on or taking off the backrest cover 3 is made easier even where the backrest cover 3 is sized and shaped to snugly fit the backrest Ab.

Next, the sitting portion Aa is covered with the sitting portion cover 2. As shown in FIG. 3, a bottom peripheral edge of the sitting portion cover 2 is expanded, and the sitting portion cover 2 is put on an external surface of the sitting portion Aa from above. Then, the fifth cover member 2e and the sixth cover member 2f are secured to the napped surface of the cloth cover put on the front and rear external surfaces of the sitting portion Aa with the mechanical fasteners B. The bottom edge of each fourth cover member 2d is pushed into the gap between the bottom side edge of the sitting portion Aa and the top side edge of the side-covering hem member Ag from the side and secured so as not to be pulled out. For preventing the fourth cover member 2d from being pulled out, the bottom edge of each fourth cover member 2d may be secured to the respective side surface of the sitting portion Aa with the mechanical fastener B or C.

Next, the headrest Ad is covered with the headrest cover 5. A bottom end of the headrest cover 5 is opened, and the headrest cover 5 is put on an external surface of the headrest Ad from above. Then, the receiving member 7 at the rear bottom edge of the first cover member 5a is inserted between the shafts Ae of the headrest Ad from behind. The insertion member 6 at the front bottom edge of the first cover member 5a is engaged with the receiving member 7, and thus the front and rear bottom edges of the first cover member 5a are secured between the shafts Ae while being attached to each other.

Then, the shafts Ae are inserted into the insertion openings Af provided on the top surface of the backrest Ab and secured.

Next, the armrest Ac is covered with the armrest cover 4. A rear end of the armrest cover 4 is opened, and the armrest cover 4 is put on an external surface of the armrest Ac from the front. Then, the rear end of the armrest cover 4 is detachably fixed with the mechanical fastener C. Thus, the seat A is completely covered with the seat cover 1.

The sitting portion cover 2, the backrest cover 3, the armrest cover 4 and the headrest cover 5 are easily taken off and exchanged by taking off the mechanical fasteners B or C or by disengaging the insertion member 6 from the receiving member 7.

Instead of the mechanical fasteners B and C, the insertion member 6 and the receiving member 7, securing means such as, for example, a slide fastener, a magnet, a clasp, a string or the like is usable. Alternatively, an elastic rubber band sewn to an edge of the seat cover 1 may be wound around the seat A, or a hook attached to an edge of the seat cover 1 may be engaged with the seat A.

As described above, according to the present invention, the bordering edges of the first through sixth cover members 2a through 2f of the sitting portion cover 2, and the first through eighth cover members 3a through 3h of the backrest cover 3, are folded back in a longitudinal direction along raised portions A1 of the sitting portion Aa and the raised portions A2 of the backrest Ab, and are creased. The creased bordering edges are attached to the remaining part of the respective members with stitches E while being kept three-dimensionally curved in conformance to the raised portions A1 and A2. Owing to such a structure, the sitting portion cover 2 and the backrest cover 3 of the seat cover 1 snugly fit the sitting portion Aa and the backrest Ab of the seat A. There is no gap between facing surfaces of the sitting portion cover 2/the backrest cover 3 and the sitting portion Aa/the backrest Ab. The positions of the sitting portion cover 2 and the backrest cover 3 do not change. The seat A provides the user with a sense of snugness as if the surface layer of the seat itself was changed, a sense of stability that his/her body is appropriately held, and a couch-like comfort. The seat cover 1 is easily produced to fit a seat A installed in various types of vehicles.

The bordering edges of the first through sixth cover members 2a through 2f of the sitting portion cover 2, and the first through eighth cover members 3a through 3h of the backrest cover 3, are sewn together and provided with stitches E while being curved so as to fit the raised portions A1 and A2. Therefore, the good appearance of the smooth curves of the seat A is not spoiled. Moreover, the curved portions of the seat cover 1 corresponding to the corners of the seat A are improved in strength, and for example, are prevented from being ruptured or cracked.

The sitting portion cover 2 and the backrest cover 3 are three-dimensionally sewn so as to have a curved shape conforming to the top surface of the sitting portion Aa and the front surface of the backrest Ab. Therefore, the posture of a person sitting on the seat A is held stably.

Figure 7:
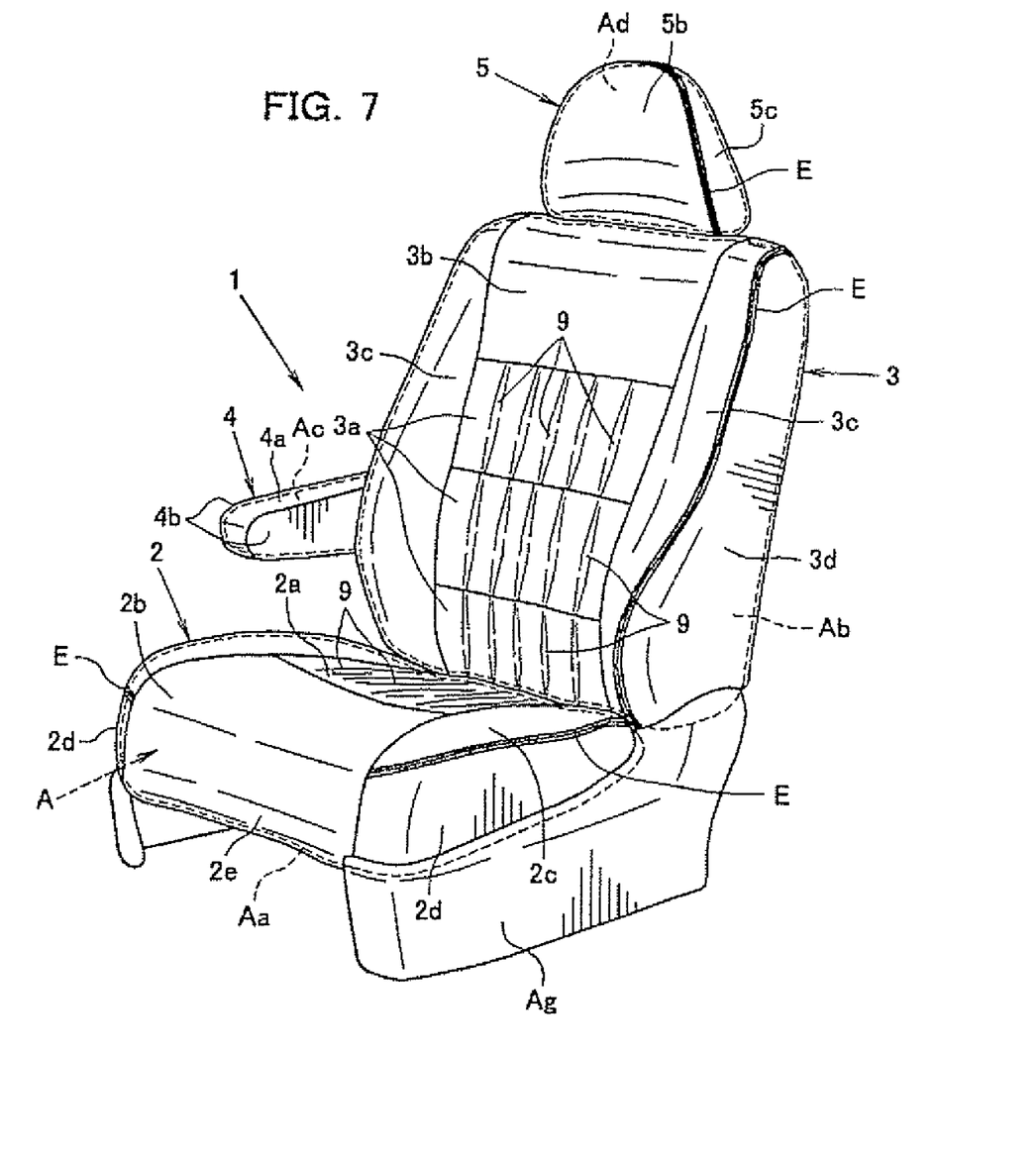
FIG. 7 is an isometric view of a seat cover according to a second embodiment of the present invention, having creases extending in a direction different from those shown in FIG. 1 through FIG. 4.

FIG. 7 shows a seat cover 1 according to a second embodiment of the present invention. The first cover member 2a included in the top portion of the sitting portion cover 2 are creased, such that a plurality of creases 9 each extending in the depth direction of the top portion are formed and arranged in a plurality of rows running in the width direction thereof at a predetermined interval. The first cover member 3a included in the front portion of the backrest cover 3 are creased, such that a plurality of creases 9 each extending in the height direction of the front portion are formed and arranged in a plurality of rows running in the width direction thereof at a predetermined interval. Owing to such an arrangement, the creases 9 formed on the sitting portion cover 2 and the backrest cover 3 are deformed, i.e., expanded or shrunk, in accordance with the body shape and the posture of a person sitting on the seat A. Therefore, substantially the same functions and effects as those of the first embodiment are provided.

Figure 8:
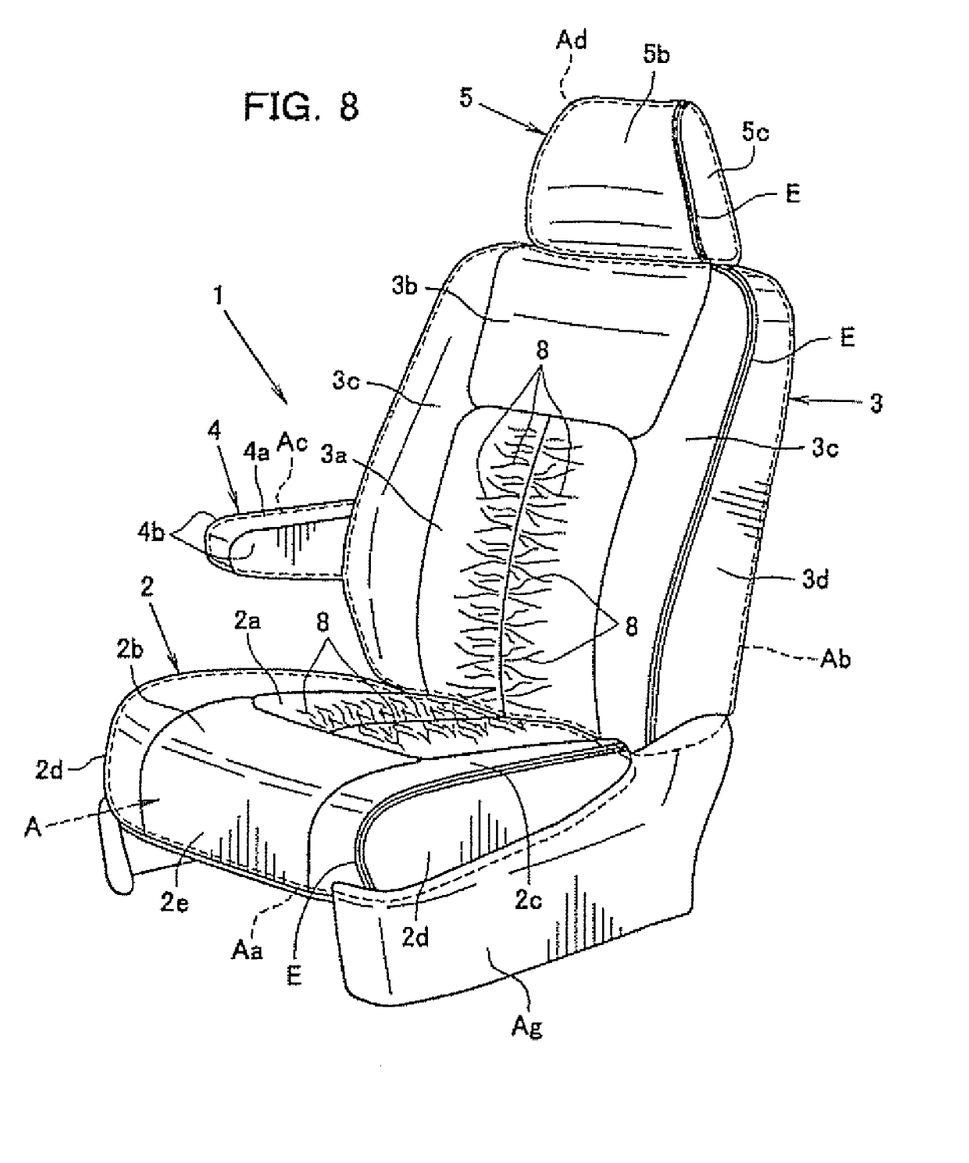
FIG. 8 is an isometric view of a seat cover according to a third embodiment of the present invention, having creases arranged along the center line.

FIG. 8 shows a seat cover 1 according to a third embodiment of the present invention. The first cover member 2a included in the top portion of the sitting portion cover 2 are creased, such that a plurality of creases 8 each extending in the width direction of the top portion are formed and arranged along the center line thereof, symmetrical with respect to the center line. The first cover member 3a included in the front portion of the backrest cover 3 are creased, such that a plurality of creases 8 each extending in the width direction of the front portion are formed and arranged along the center line thereof, symmetrical with respect to the center line. Owing to such an arrangement, the creases 8 formed on the sitting portion cover 2 and the backrest cover 3 are deformed, i.e., expanded or shrunk, in accordance with the body shape and the posture of a person sitting on the seat A. Therefore, substantially the same functions and effects as those of the first embodiment are provided.

Figure 9:
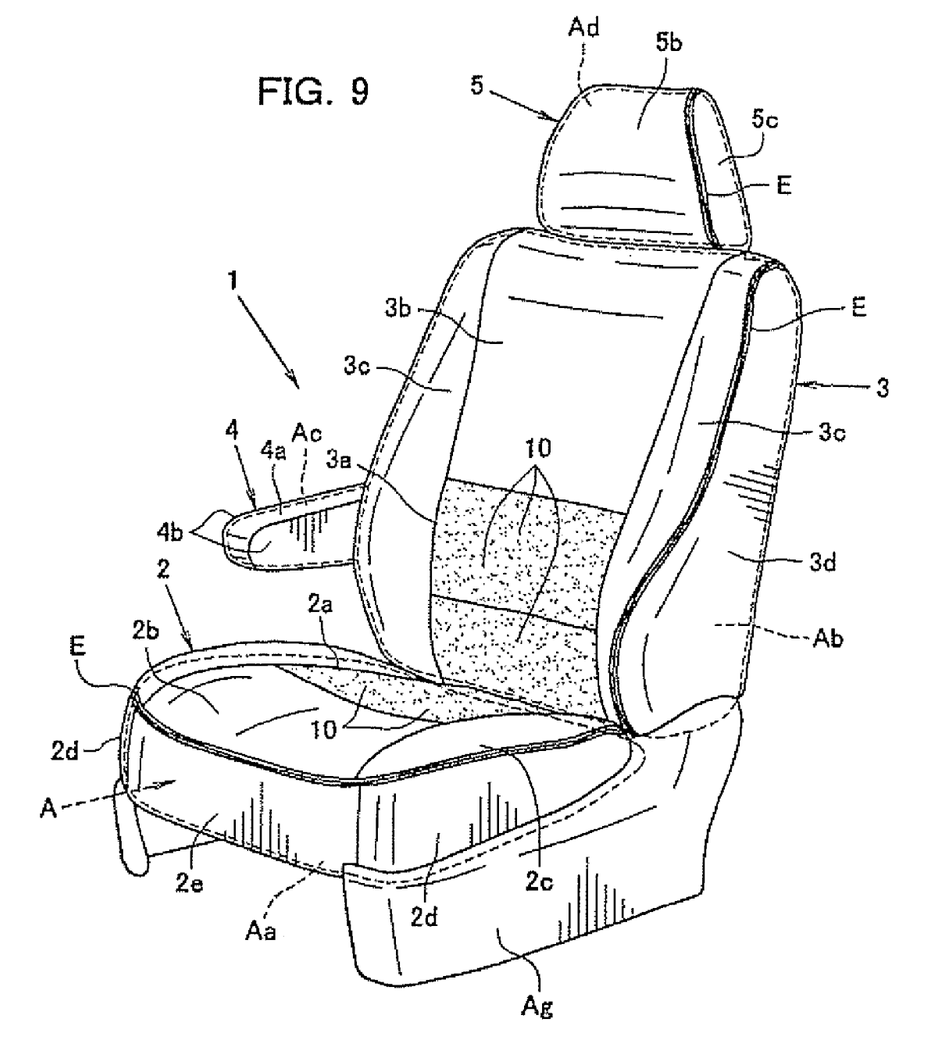
FIG. 9 is an isometric view of a seat cover according to a fourth embodiment of the present invention, in which a portion between side raised portions of the sitting portion cover and a portion between side raised portions of the backrest cover have a flat surface.

FIG. 9 shows a seat cover 1 according to a fourth embodiment of the present invention. The first cover member 2a included in the top portion of the sitting portion cover 2 and the first cover member 3a included in the front portion of the backrest cover 3 have a plurality of (a great number of) holes 10. Owing to such an arrangement, a part of the body contacting the sitting portion cover 2 or the backrest cover 3 is prevented from getting sweaty. Therefore, substantially the same functions and effects as those of the first embodiment are provided. In addition, since a portion between side raised portions of the sitting portion cover 2 and a portion between side raised portions of the backrest cover 3 have a flat surface, removal of dust, stains and the like can be smoothly conducted.

In the above description, the mechanical fasteners B and C, and a combination of the insertion member 6 and the receiving member 7 act as fixing means.

The present invention is not limited to the above-described embodiments, and various other modifications will be apparent to those skilled in the art without departing from the scope and spirit of this invention.

What is claimed is:

1. A seat cover, comprising:
    a sitting portion cover for covering a sitting portion of a seat, wherein the sitting portion cover comprises:
    a first cover member for covering a main part of a top surface of the sitting portion;
    a second cover member for covering a front part of the top surface of the sitting portion;
    third cover members for covering right and left side parts of the top surface of the sitting portion;
    fourth cover members for covering right and left side surfaces of the sitting portion;
    a fifth cover member for covering a front surface of the sitting portion; and
    a sixth cover member for covering a rear surface of the sitting portion;
    wherein:
    the first cover member, the second cover member and the third cover members are sewn together along bordering edges thereof;
    the fourth cover members, the fifth cover member and the sixth cover member are sewn together along bordering edges thereof; and the bordering edge of the second cover member/the third cover members and the bordering edge of the fourth cover members/the fifth cover member are folded back in a longitudinal direction along raised portions of a top surface of a sitting portion, are creased such that a bordering edge having a smaller radius of curvature has a larger creased area than a bordering edge having a larger radius of curvature, and are attached to a remaining part of the second, third, fourth and fifth cover members with stitches while being kept curved in conformance to the raised portions, so as to form a three-dimensional curved shape conforming to the top surface of the sitting portion.

2. The seat cover according to claim 1, wherein two stitch lines are formed parallel to each other along the bordering edges.

3. The seat cover according to claim 1, wherein a bottom edge of each of the fourth cover members is deformable so as to be pushed into a gap between a corresponding bottom side edge of the sitting portion and a top side edge of a corresponding side-covering hem member, and is recoverable so as not to be pulled out through the gap after being pushed into the gap.

4. The seat cover according to claim 1, wherein a top portion of the sitting portion cover has creases each extending in a width direction thereof, which are arranged in a plurality of columns running in a depth direction thereof at a predetermined interval.

5. The seat cover according to claim 1, wherein a top portion of the sitting portion cover has creases each extending in a depth direction thereof, which are arranged in a plurality of rows running in a width direction thereof at a predetermined interval.

6. The seat cover according to claim 1, wherein a top portion of the sitting portion cover has a plurality of air-permeable holes arranged at a predetermined interval.

7. The seat cover according to claim 1, wherein a top portion of the sitting portion cover includes a leather layer, a high density cotton layer, a low repellence sponge layer, a tricot layer and an air-permeable back layer stacked in this order from a surface for contacting a person sitting on the seat cover.

8. The seat cover according to claim 1, wherein the sitting portion cover comprises fixing means for detachably fixing the sitting portion cover to the sitting portion.

9. A seat cover, comprising:
a backrest cover for covering a backrest of a seat, wherein the backrest cover comprises:
a first cover member for covering a main part of a front surface of the backrest;
a second cover member for covering an upper part of the front surface of the backrest;
third cover members for covering right and left side parts of the front surface of the backrest;
fourth cover members for covering right and left side surfaces of the backrest;
a fifth cover member for covering a top surface of the backrest;
a sixth cover member for covering an upper part of a rear surface of the backrest; and
a seventh cover member for covering a lower part of the rear surface of the backrest;
wherein:
the first cover member, the second cover member and the third cover members are sewn together along bordering edges thereof;
the fourth cover members, the fifth cover member, the sixth cover member and the seventh cover member are sewn together along bordering edges thereof; and
the bordering edge of the second cover member/the third cover members and the bordering edge of the fourth cover members/the fifth cover member are folded back in a longitudinal direction along raised portions of the front surface of the backrest, are creased such that a bordering edge having a smaller radius of curvature has a larger creased area than a bordering edge having a larger radius of curvature, and are attached to a remaining part of the second, third, fourth and fifth cover members with stitches while being kept curved in conformance to the raised portions, so as to form a three-dimensional curved shape conforming to the front surface of the backrest.

10. The seat cover according to claim 9, wherein two stitch lines are formed parallel to each other along the bordering edges.

11. The seat cover according to claim 9, wherein a front portion of the backrest cover has creases each extending in a width direction thereof, which are arranged in a plurality of columns running in a height direction thereof at a predetermined interval.

12. The seat cover according to claim 9, wherein a front portion of the backrest cover has creases each extending in a height direction thereof, which are arranged in a plurality of rows running in a width direction thereof at a predetermined interval.

13. The seat cover according to claim 9, wherein a front portion of the backrest cover has a plurality of air-permeable holes arranged at a predetermined interval.

14. The seat cover according to claim 9, wherein a front portion of the backrest cover includes a leather layer, a high density cotton layer, a low repellence sponge layer, a tricot layer and an air-permeable back layer stacked in this order from a surface for contacting a person sitting on the seat cover.

15. The seat cover according to claim 9, wherein the backrest cover comprises fixing means for detachably fixing the backrest cover to the backrest.

* * * * *